United States Patent [19]

Hansen

[11] 3,828,120

[45] Aug. 6, 1974

[54] FLEXIBLE FLAT POWER CABLE
[75] Inventor: Theodore E. Hansen, Grant, Ind.
[73] Assignee: The Anaconda Company, New York, N.Y.
[22] Filed: Oct. 23, 1973
[21] Appl. No.: 408,718

[52] U.S. Cl....... 174/117 FF, 174/115, 174/121 SR
[51] Int. Cl. ............................................. H01b 7/08
[58] Field of Search........ 174/117 FF, 115, 120 SR, 174/121 SR

[56] References Cited
UNITED STATES PATENTS
3,459,880  8/1969  Erdle............................ 174/117 FF
3,621,118  11/1971  Bunish................................ 174/115

Primary Examiner—E. A. Goldberg
Attorney, Agent, or Firm—Victor F. Volk

[57] ABSTRACT

A flat power cable has flattened conductors with their long sections transverse to the long section of a cable. The conductors have a rope lay of six strands instead of the usual seven.

4 Claims, 3 Drawing Figures

PATENTED AUG 6 1974 3,828,120

FLEXIBLE FLAT POWER CABLE

BACKGROUND OF THE DISCLOSURE

Flexible cables, particularly cables for use in portable mining machines which are continuously wound and unwound upon reels as the machine is moved back and forth, have traditionally short working lives. Mining machine cables in common use have had three phase conductors to carry the power for the mining machine. Each of these phase conductors is constructed of seven strands of bunched wires, with the strands being cabled in a round configuration. After being individually insulated the three power conductors are laid parallel to form a flat cable. An improvement in such cables, typified by the cable construction described in U.S. Pat. No. 3,621,118 has included additional smaller grounding and ground check conductors which are flattened to save on the width of the flat cable. This saving transpires since the thickness or small sectional dimension of the cable is determined, in any event, by the diameter of the power conductor, and full advantage of this thickness can be taken for the smaller grounding and ground check conductors only by making them flat with their long sectional dimensions transverse to the long sectional dimensions of the overall cable. These auxiliary conductors which carry only nominal currents compared to the power conductors are then comprised of six rope-lay strands, instead of seven, to facilitate flattening.

SUMMARY

I have now discovered that when a flat cable is constructed with power conductors that have a flattened rope lay of six strands such a cable will endure more flexing than conventional cables. This discovery is extremely surprising since the power conductors are now bent around their short axes when the flat cable is flexed. Such bending is known, on conventional beam theory, to stretch the fibers at the outer extreme and compress those at the inner extreme proportionately to the width of the long axis of the section. However, I have found, as shall be shown, that my new cable outlasts the same Awg size cable having round conductors and have invented a flat power cable comprising a plurality of parallel flexible flat power carrying conductors aligned with each other along their short axes and each comprising six strands which, prior to flattening, are twisted in a symmetrical hollow helix having a selected length and direction of lay. Each of the strands of these conductors comprises a plurality of at least seven wires twisted with a length of lay preferably shorter than the length of lay of the helix. Each of the conductors is flattened so as to comprise a long dimension in section at least 1 ½ times that of its short sectional dimension, and is surrounded by an extruded layer of electrical insulation. My cable has an overall extruded polymeric jacket and comprises a long dimension in section transverse to the long dimension in section of the conductors.

A three-phase portable-machine cable of my invention comrises five parallel flexible flat conductors aligned with each other on their short axes. Each of these five conductors comprises six strands which, prior to flattening, are twisted together in a symmetrical hollow helix having a selected length and direction of lay. Each of the strands comprises a plurality, in excess of twenty, of wires that are bunch stranded with a lay having the same direction as that of the helix, but a length of lay shorter than the length of lay of the helix, and is flattened so as to have a long sectional dimension at least twice that of its short sectional dimension. A layer of extruded electrical insulation surrounds each of the conductors, and a polymeric jacket is extruded overall. In one preferred embodiment of my portable-machine cable, the metal area of each of the conductors is substantially the same, while the thickness of insulation on the flat side of the three power conductors may substantially exceed the thickness of insulation on the flat side of the remaining conductors used for grounding and ground check. These can then each be positioned between two of the power conductors.

DETAILED DESCRIPTION OF PREFERRED EMBODIMENT

Figure 1:
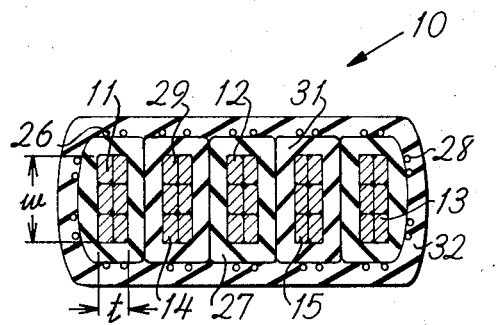
FIG. 1 shows a section of a power cable of my invention.

Referring first to FIG. 1 a portable-machine cable 10 has three power phase conductors 11, 12, 13, a grounding conductor 14 and a ground check conductor 15. As an essential novel feature, the power conductors 11, 12, and 13 are flat having a long sectional dimension or width $w$, at least 1½ times their short sectional dimension or thickness $t$. In the cable 10 the metallic conductors are uniform in construction so that the conductors 14 and 15 have a like configuration to the conductors 11, 12, 13. The illustrated cable is No. 8 Awg (American Wire Gauge) but larger sizes may be similarly constructed. With larger phase conductors 11, 12, 13, I prefer that the conductors 14 and 15 should have smaller areas than the phase conductor areas. Each of the conductors 11–15 is made by flattening a wire strand construction 16 of FIG. 2 between rollers. The construction 16 has six strands, 17, 18, 19, 20, 21, 22, each made by bunching together 43 No. 32 Awg tin-coated soft copper wires 23 with a left hand 1-inch length of lay. This large number of wires for a strand is intended to obtain the high flex life required by portable mining machine cables for which service the number of wires should always exceed twenty. Where my new six-strand flattened power conductor concept is employed for concentric conductor cables for which extreme flexibility is not required, each of the strands will comprise at least seven wires. In the bunching operation, also referred to as bunch stranding, wires such as the wires 23 are twisted together without regard to any particular geometrical arrangement, with respect to each other, of the individual wires. The six bunched strands 17-22 are then cabled together with a 2½ inch left hand lay by means of a cabling machine that is customarily used for cabling seven strands. In the present case however, the center strand is simply omitted to form the hollow helix of the construction 16. The helical constructions 16 are passed through flattening rollers to a short dimension of about 0.122 which is about twice the diameter of one of the bunched strands 18, and a long dimension of about 0.183 inch which is about three times the dimension of the strand 18. A greater degree of flattening to the point that the long sectional dimension is twice that of the short sectional dimension of a conductor 11 can be practiced, but I have found that a longer flex life results from the 1½ to 1 dimensional ratio.

After flattening, the conductors 11, 12, and 13 are insulated with a polymeric extrusion 26, 27, 28 of a rubber-like composition such for example as neoprene, ethylene-propylene copolymer or terpolymer or blends thereof with polyethylene, butyl rubber, etc. In the preferred illustrated cable 10 the insulation comprises a blend of about 70 percent ethylene-propylene rubber and 30 percent cross linked polyethylene with an outer long sectional dimension of 0.348 inch an outer short sectional dimension of 0.233 inch. The conductors 14, 15 have extruded insulations 29, 31 of the same composition and with the same long sectional dimension as the insulations 26–28, but with a short sectional dimension of 0.173 inch. Where it is desired to round out the ends of the completed cable the insulations 11, 13 can be extruded in a D shape as disclosed in U.S. Pat. No. 3,621,118 for round conductors. The insulated conductors, laid parallel with their axes through the short dimensions in alignment, are covered with an open nylon or other fabric braid and then extruded with a neoprene jacket 32 to the outside dimension of 1.426 inches × 0.640 inch. Neoprene is chosen for its toughness and non-commbustibility but chlorosulfonated polyethylene, sold under the trademark Hypalon by E. I. Dupont deNemours, Inc., is also eminently suitable for use in the jacket 32.

Figure 3:
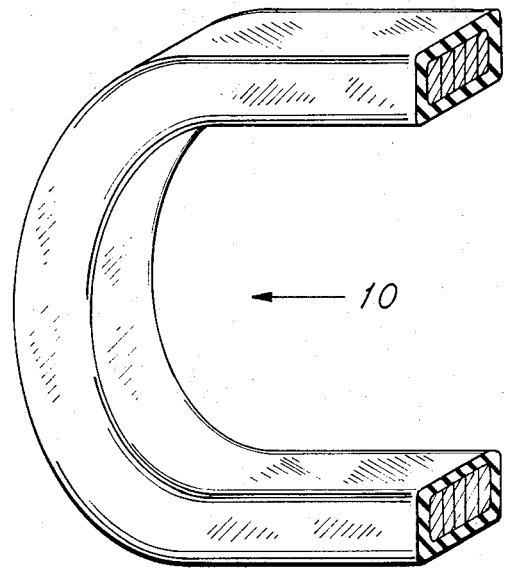
FIG. 3 shows a pictorial view of a bent portion of a cable of my invention.

An illustration is made in FIG. 3 of the effect of bending the cable 10 in service. From FIG. 3 it is evident that the power conductors, 11 12, 13 have their long dimensions w transverse to the long dimension of the cable section and when the cable is flexed, as it is in service, on its long axis, the conductors are made to flex on their short axes, contrary to accepted practice.

EXAMPLE

Figure 2:
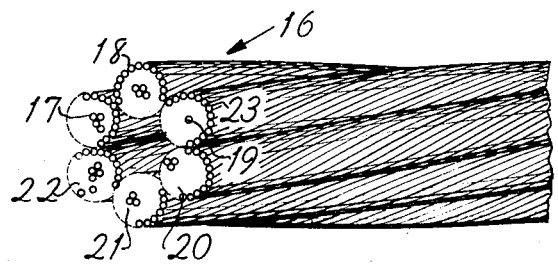
FIG. 2 shows a pictorial view of a conductor of my cable prior to flattening.

A cable made in accordance with the FIGS. 1 and 2 in the dimensions hereinabove described was tested in comparison with a No. 8 Awg cable having conventional round conductors, by repeated flexing under a tension of 231 pounds over 6-inch diameter pulleys. The power conductors of the conventional cable were stranded of seven bunched strands each having 19 No. 29 Awg wires and had an outside diameter of 0.167 inch compared to the 0.183 inch long dimension of the conductors 11, 12, 13. The conventional cable in the above test failed after 1,322 cycles, while the cable 10 withstood 4,240 cycles to failure. The disparity was accenuated by raising the tension to 660 pounds during test of the cable 10 for the last 1,605 cycles. Part of the superior performance of the cable 10 may be ascribed to the use of finer wires: Awg 32 compared to Awg 29, but the difference in wire size in cables of similar construction is known to increase the cycle life under the same loading no more than to double it, and the exampled unexpectedly high ratio of imrpovement results from features of the new cable hereinafter claimed for Letters Patent.

I claim:
1. A flat power cable comprising:
A. a plurality of parallel flexible flat power carrying conductors aligned with each other on their short axes,
B. each of said conductors comprising six strands, said strands, prior to flattening, being twisted in a symmetrical hollow helix having a selected length and direction of lay,
C. each of said strands comprising a plurality of at least seven of wires twisted with a length of lay shorter than the length of lay of said helix,
D. each of said conductors being flattened to comprise a long sectional dimension at least about one and one half times that of its short sectional dimension,
E. an extruded layer of electrical insulation surrounding each of said conductors, and
F. an overall extruded polymeric jacket, said cable comprising a long sectional dimension transverse to said long sectional dimension of said conductors.

2. A three-phase portable-machine cable comprising:

A. five parallel flexible flat conductors aligned with each other on their short axes,
B. each of said conductors comprising six strands, said strands prior to flattening, being twisted together in a symmetrical hollow helix having a selected length and direction of lay,
C. each of said strands comprising a plurality in excess of twenty of wires bunched stranded with a lay having the same direction as the lay of said helix and a length of lay shorter than the length of lay of said helix,
D. each of said conductors being flattened to comprise a long sectional dimension at least one and one half times that of its short sectional dimension,
E. an extruded layer of electrical insulation surrounding each of said conductors, and
F. an overall extruded polymeric jacket.

3. The cable of claim 1 wherein the metal area of each of said conductors is substantially the same.

4. The cable of claim 2 wherein the thickness of said insulations on the flat side of three of said conductors substantially exceeds the thickness of said insulation on the flat side of the remaining two of said conductors, each of said two conductors being positioned between two of said three conductors.

* * * * *